Patented Oct. 2, 1951

2,570,028

UNITED STATES PATENT OFFICE 2,570,028

AMMONIUM THIOCYANATE-PARTIALLY RESINIFIED FURFURYL ALCOHOL RESINS

Andrew P. Dunlop, Riverside, and Paul R. Stout, Chicago, Ill., assignors to The Quaker Oats Company, a corporation of New Jersey No Drawing. Application September 29, 1947, Serial No. 776,862

1 Claim. (Cl. 260—88.5)

This invention relates to novel synthetic resins of the thermosetting type which are formed by the condensation of ammonium thiocyanate and furfuryl alcohol partial polymer (partially resinified furfuryl alcohol).

This application is a continuation-in-part of our copending application Serial No. 772,022, filed September 3, 1947, and now U. S. Patent 2,526,644.

These new resins when used alone or together with other resinous materials are useful in the preparation of solutions for protective coatings and varnishes and for impregnating and laminating purposes, and in the preparation of cast and molded products. In connection with the latter use, the resins may be used in conjunction with suitable fillers such as wood flour, asbestos fiber, glass wool and the like. Surface coatings containing the resins are particularly useful as a sealer or finishing coat for table tops of wood and similar materials and for wire.

In general, the invention comprises the reaction under the influence of heat of ammonium thiocyanate and partially polymerized furfuryl alcohol to form a resinous reaction product. The application of heat to the reaction mixture quickly brings about the formation of a water-insoluble, liquid thermosetting resin which, on further heating, converts to a solid and infusible resin resistant to both acidic and basic chemical reagents. In the preferred aspects of the present invention the reaction temperatures and the reaction times are controlled so that there is obtained an intermediate water-insoluble, liquid thermosetting resin.

The partially polymerized furfuryl alcohol which may be used in accordance with the present invention is a pourable, partially resinified furfuryl alcohol of any desired viscosity. It may be prepared by any of the known methods, but we prefer to prepare it in accordance with the procedures described in our copending application Serial No. 758,508, filed July 2, 1947. In general, it may be prepared by heat alone or by heat in conjunction with a catalyst, as is well-known.

In carrying out the present invention, partially resinified furfuryl alcohol is condensed with ammonium thiocyanate at an elevated temperature until a liquid thermosetting resin is obtained. The condensation reaction may be effected by heat alone or by the aid of a catalyst. If a catalyst is used it is preferred that it be of an acidic nature. Maleic anhydride is an example of a suitable catalyst in accordance with the present invention.

The reaction of ammonium thiocyanate with furfuryl alcohol to form a liquid resin is described in the Root and Virgin Patent No. 2,368,426, granted January 30, 1945. In general, the liquid resins produced in accordance with the procedures described in this patent are slowly thermosetting. The resins produced in accordance with the present invention, on the other hand, are, in general, more quickly thermosetting.

The proportions of reactants which may be used in making the resins of the present invention may be varied rather widely, as desired, to meet any desired need in the final product as to flexibility, adhesiveness and hardness. Thus, for example, equal quantities, by weight, of the reactants may be used. We prefer, however, to use an excess by weight of the partially resinified furfuryl alcohol with respect to the ammonium thiocyanate, say from about 2 to 10 parts by weight of the former to 1 part by weight of the latter. Still larger amounts of the partially resinified furfuryl alcohol with respect to the ammonium thiocyanate may be used, but such larger amounts may adversely affect the character of the final resin, from the standpoint of hardness and flexibility.

The reaction between the partially resinified furfuryl alcohol and the ammonium thiocyanate may be effected in an open vessel; however, it is preferred to carry out the reaction under reflux conditions. Care should be exercised in carrying out the reaction since the reactants have a tendency to become uncontrollably exothermic, especially in the large amounts necessary to prepare commercial-sized batches. In general, the reaction temperatures may vary from about 60° to 120° C., and the reaction times from about 10 minutes to 1½ hours. At the higher temperatures and with the longer reaction times, the reaction mixture should be stirred constantly throughout the reaction and the reaction should be watched carefully so that it can be interrupted should it show a tendency to become uncontrollably exothermic. This may be done by quickly cooling the reaction mixture so that the resin will not become converted to the infusible state. If the reactants are preliminarily heated under reflux at temperatures of from about 60° to 90° C., for about 1 to 8 hours, a partial reaction between the reactants takes place and this eliminates or greatly reduces the tendency of the reaction to become uncontrollably exothermic. After the preliminary heating, the reaction mixture can safely be heated to a higher temperature to complete the preparation of the resin, say up to 120° C. and even somewhat higher and in an open or closed vessel, as desired.

The present invention will be readily understood from the following Examples 2 to 7 which are illustrative of methods of preparing liquid resinous products in accordance with the present invention. It is to be understood that the invention is not to be limited to the specific conditions or details set forth in these illustrative examples.

Example 1 is a resin formed by reacting furfuryl alcohol with ammonium thiocyanate in accordance with the procedures of the aforesaid Root and Virgin patent. The stroke cure time of this resin is given for contrast with the stroke cure times of the resins of Examples 2 to 7.

In all of the examples parts given are parts by weight.

Example 1

100 parts of ammonium thiocyanate and 300 parts of furfuryl alcohol were stirred in an open flask at 120° C. After about 20 minutes the exothermic reaction raised the temperature to about 137° C. for 10 minutes. After the temperature had subsided the heating was continued at 120° C. to give a total reaction time of 1½ hours. The resulting product was a thick liquid resin which had a stroke cure of 11 minutes and a solids yield of 79%.

The solids yield is determined by heating five to ten grams of the resin in an oven at 180°–200° C. for about 16 hours. The weight of the cured product so obtained, divided by the weight of reactants in the sample heated (excluding solvents such as water), gives the solids yield.

The stroke cure has been defined as the time required for a resin to convert from a fusible or liquid condition at a definite temperature while being stroked with a spatula to a condition at which the spatula either no longer sticks to the resin or slides over it with relative ease. In practice about 2 cc. of the resin is placed on a hot plate, the temperature of which is adjusted to 145°–150° C., and stroked (approximately 90–100 strokes per minute) with the flat side of a spatula to smooth the resin into a square 2 to 3 inches on a side. The time in seconds for the volatiles to evaporate, for the resin to start to become stringy or gummy and the cure time are recorded.

Example 2

A mixture of 30 parts of a furfuryl alcohol acid-catalyzed partial polymer having a viscosity of 106 centipoises and a specific gravity of 1.19 at 25° C. and 10 parts of ammonium thiocyanate was heated in an open beaker with stirring for 20 minutes. The beaker was held in a wax bath maintained at a temperature of 115°–117° C. A liquid resin was obtained which had a stroke cure of 20 seconds and a solids yield of 77%.

Example 3

A mixture of 60 parts of the furfuryl alcohol partial polymer described in Example 2 and 20 parts of ammonium thiocyanate was heated under reflux for 1 hour in a wax bath maintained at a temperature of 80° C. The resin temperature was 62°–77° C. The reflux condenser was replaced by an air stream and the resin temperature was raised to 79°–94° C. for 10 minutes. A liquid resin was obtained which had a stroke cure of 35 seconds and a solids yield of 79%.

Example 4

Technical furfuryl alcohol was refluxed for 68 hours, yielding a liquid furfuryl alcohol heat resin having a viscosity of about 2 centipoises at 25° C. A mixture of 60 parts of this furfuryl alcohol heat resin and 20 parts of ammonium thiocyanate was heated under reflux in a steam bath at about 90° C. for about 8 hours. The reflux condenser was then replaced by a stream of air, and heating was continued on a wax bath at 120° C. for 20 minutes. During this time the resin temperature was 80°–97° C. A liquid resin was obtained which had a stroke cure of 1½ minutes and a solids yield of 70%.

Example 5

A mixture of 50 parts of the furfuryl heat resin of Example 4 and 25 parts of ammonium thiocyanate was heated under reflux in a steam bath at about 90° C. for about 8 hours. The reflux condenser was then replaced by a stream of air, and heating was continued on a wax bath at 120° C. for 25 minutes. A liquid resin was obtained which had a stroke cure of 5 minutes and a solids yield of 70%.

Example 6

A mixture of 60 parts of the furfuryl alcohol heat resin described in Example 4 and 6 parts of ammonium thiocyanate was heated under reflux in a steam bath at about 90° C. for about 8 hours. The reflux condenser was then replaced by a stream of air, and heating was continued on a wax bath at 120° C. for ½ hour. During this time the resin temperature was 85°–105° C. A liquid resin was obtained which had a stroke cure of 3 minutes and a solids yield of 81%.

Example 7

Furfuryl alcohol was boiled in an apparatus provided with an air condenser for 12½ hours to form a furfuryl alcohol heat resin having a viscosity of about 4½ centipoises and a specific gravity of 1.175 at 25° C.

A mixture of 30 parts of this furfuryl alcohol heat resin and 10 parts of ammonium thiocyanate was heated in an open vessel on a bath maintained at 120° C., with stirring for 1½ hours. The resulting product was a liquid resin which had a stroke cure of 4 minutes and a solids yield of about 72%.

The furfuryl alcohol heat polymers and the furfuryl alcohol acid-catalyzed partial polymers of the foregoing examples may be replaced by other liquid partially resinified furfuryl alcohol resins. Thus, for example, the acid-catalyzed furfuryl alcohol partial polymer of Example 2 can be replaced by an acid-catalyzed furfuryl alcohol partial polymer prepared as follows:

A mixture of 45 lbs. of technical furfuryl alcohol and 4½ lbs. of water was heated to boiling, and a solution of 22½ ml. of 85% $H_3PO_4$ in 200 ml. of water was added slowly. After refluxing for three hours, the mixture was neutralized by adding a solution of 26 grams of NaOH in 300 ml. of water. The mixture was cooled, allowed to stand overnight, and the water layer separated and discarded. The resulting resinous partial polymer had a viscosity of about 20 centipoises at 25° C.

In general, the resins prepared in accordance with the present invention cure rapidly at temperatures of about 150° to 175° C. without added curing catalysts. Curing catalysts such as hexamethylenetetramine do not appear to increase the rate of curing to any appreciable extent.

We claim:

A process of producing a new artificial resin which comprises heating a mixture of a liquid, partially resinified furfuryl alcohol and ammonium thiocyanate under reflux at a temperature of about 60 to 90° C., for about 1 to 8 hours, to effect a partial reaction between the said reactants, and thereafter heating the partially reacted product at a higher temperature up to about 120° C., at least until a liquid thermosetting resin is produced.

ANDREW P. DUNLOP.
PAUL R. STOUT.

REFERENCES CITED

The following references are of record in the file of this patent:

UNITED STATES PATENTS

| Number | Name | Date |
|---|---|---|
| 2,368,426 | Root et al. | Jan. 30, 1945 |
| 2,383,793 | Harvey et al. | Aug. 28, 1945 |
| 2,404,840 | Harvey | July 30, 1946 |